(12) United States Patent
Beard

(10) Patent No.: US 7,211,034 B2
(45) Date of Patent: May 1, 2007

(54) TRANSLATABLE SINGLE DRIVE MEANS FOR MULTIPLE FLEXIBLE-SHAFT HAND TOOLS

(76) Inventor: Guy Beard, 2763 Southwood La., Jacksonville, FL (US) 32207

( * ) Notice: Subject to any disclaimer, the term of this patent is extended or adjusted under 35 U.S.C. 154(b) by 0 days.

(21) Appl. No.: 11/335,388

(22) Filed: Jan. 19, 2006

(65) Prior Publication Data
US 2006/0172873 A1 Aug. 3, 2006

Related U.S. Application Data

(60) Provisional application No. 60/645,483, filed on Jan. 19, 2005.

(51) Int. Cl.
*B23Q 31/57* (2006.01)
*B23P 23/00* (2006.01)

(52) U.S. Cl. .......................... 483/30; 29/560; 408/127

(58) Field of Classification Search .................. 483/10, 483/11, 16, 17, 18, 22, 25, 26, 30, 36, 7, 8, 483/51, 52, 53, 54; 29/26 A, 40, 41, 564, 29/565, 566, 560; 409/175, 181, 182; 408/127, 408/146, 199, 31, 34, 35; 83/559, 560, 563, 83/651, 662; 318/51, 53; 248/51; 474/58
See application file for complete search history.

(56) References Cited

U.S. PATENT DOCUMENTS

| | | |
|---|---|---|
| 504,289 A | 8/1893 | Vanderbeek et al. |
| 1,698,952 A | 7/1929 | Hoover |
| 1,918,952 A | 7/1933 | Bachmann et al. |
| 2,898,792 A | 8/1959 | Fox et al. |
| 2,956,454 A | 10/1960 | Hansen |
| 3,191,260 A | 6/1965 | Jorgensen |
| 3,304,609 A | 2/1967 | Horowitz et al. |
| 3,556,669 A | 1/1971 | Valeska et al. |
| 3,635,569 A | 1/1972 | Sato et al. |
| 3,702,940 A | 11/1972 | Stewart |
| 3,830,584 A | 8/1974 | Ohlig et al. |
| 3,847,039 A | 11/1974 | Azuma |
| 4,514,172 A | 4/1985 | Behringer |
| 4,593,731 A | 6/1986 | Tanaka |
| 4,676,750 A | 6/1987 | Mason |
| 4,945,958 A | 8/1990 | Shoda |
| 4,956,589 A | 9/1990 | Cherlo |
| 5,107,899 A | 4/1992 | Murphy |
| 5,245,735 A | 9/1993 | Tanashian |
| 5,720,090 A | 2/1998 | Dawson, Jr. |
| 5,730,691 A | 3/1998 | Tokura et al. |
| 5,873,717 A | 2/1999 | Behringer |

*Primary Examiner*—Dana Ross
(74) *Attorney, Agent, or Firm*—Thomas C. Saitta

(57) ABSTRACT

An apparatus for operating multiple tool bits, all being independently powered through flexible shafts by a single motor, wherein each flexible shaft is connected to a dedicated docking station, and the single drive motor is operatively connected to a given docking station only when the particular tool bit dedicated to that particular docking station is desired to be operational. The motor is translated along a track corresponding to the pathway defined by the docking stations.

13 Claims, 3 Drawing Sheets

TRANSLATABLE SINGLE DRIVE MEANS FOR MULTIPLE FLEXIBLE-SHAFT HAND TOOLS

This application claims the benefit of U.S. Provisional Patent Application Ser. No. 60/645,483, filed Jan. 19, 2005.

BACKGROUND OF THE INVENTION

This invention relates in general to powered hand tools and more particularly to hand tools powered by a rotating flexible shaft or cable. Even more particularly, the invention relates to apparatuses incorporating multiple powered hand tools that accomplish differing purposes, such that the user selectively activates a particular tool when it is desired to perform a specific work operation.

It is common to have situations where a plurality of different operations, such as cutting, grinding, polishing, deburring, drilling, etc., needs to be applied to a given workpiece or object, such as for example in the fields of jewelry, wood working, dentistry or the like. In many cases, the different operations are performed by a powered hand tool having interchangeable, axially rotated tool bits, such as a hand drill, a polisher, a grinding disc, a wire brush, etc. Portable electric drills, routers, grinders or the like are well known powered hand tools. For operations requiring fine motor skills, the weight of the drive motor becomes a problem. To counter this weight problem, smaller handheld motors have been developed, such as those sold under the Dremel brand, and it is also known to provide a flexible drive shaft or cable between the drive motor and a tool bit holder or handpiece, such that the heavy motor can be suspended or placed onto a support. In either event, it is still excessively time consuming to utilize a single drive motor where each tool bit must be removed and replaced by a different tool bit when a different operation is to be performed, especially when the same tool bits may have to be used multiple times when working on an object.

To address the problem of the work stoppage and lost time that occur when it is necessary to interchange tool bits, it is known to provide work stations with multiple motors, each motor having a dedicated flexible drive shaft, dedicated tool piece and dedicated or interchangeable tool bits. A foot pedal actuator is typically provided to switch power on and off such that only the motor driving the desired tool bit of the moment is operational. Such an apparatus is shown for example in U.S. Pat. No. 5,245,735 to Tanashian. With this set-up, an operator may switch from one tool bit to another simply by putting down the first handpiece, which precludes receipt actuation of the first motor, picking up the second handpiece, which allows activation of the second motor, and depressing the foot pedal to activate the second motor to initiate rotation of the flexible cable and second tool bit.

An apparatus of such type that requires multiple motors is more expensive than one utilizing a single motor, so improved apparatuses have been developed wherein a single drive motor is used to operate multiple tool bits. These apparatuses typically involve complicated gearing, valves, clutch mechanisms or electrical circuits such that only one of the tool bits is powered at a time. It is also known to provide multiple tools mounted onto a turret such that each of the tools can be aligned and connected to a motor of fixed position. Such apparatuses are not practical for handheld tools driven by flexible shafts, since rotation of the turret would necessarily entail movement of all the cables, leading to entanglement and other problems.

It is an object of this invention to address the problems set forth above by providing an apparatus having a single motor to selectively drive at a particular time any one of a plurality of axially rotated tool bits through rotation of each tool bit's dedicated flexible drive shaft or cable, wherein the flexible cables are mounted in fixed relation along a track or pathway and wherein the motor itself is translated along the track or pathway for alignment and engagement with the particular flexible cable and tool bit to be utilized. It is a further object to provide such an apparatus wherein the motor is also moved in a direction at an angle away from the plane containing the track, most preferably perpendicularly, to release from a first flexible cable and connect to a second flexible cable, the motor being translated along the track after release from the first flexible cable to be properly positioned for connection to the second flexible cable.

SUMMARY OF THE INVENTION

The invention is in general an apparatus for operating a plurality of handpieces, each having a particularized or dedicated tool bit, wherein each tool bit is rotated by a flexible shaft temporarily connected to a powered drive motor means when use of a particular hand tool is desired. The invention comprises a single drive means or motor capable of rotating a flexible drive shaft or cable, wherein the drive means is translated into indexed positions in communication with one of a plurality of indexed docking stations, each docking station having a dedicated power transmission cable and handpiece. Separation means to disconnect the drive means from one such docking station and to connect the drive means to a second docking station are provided. Actuation means to operate the desired tool bit are also provided.

In an exemplary embodiment, the invention comprises a plurality of docking stations arranged along a track or pathway. A flexible drive shaft or cable is connected to each docking station, and a handpiece retaining a tool bit is connected to each flexible drive shaft, such that each docking station is dedicated to a single cable, handpiece and tool bit in combination. A drive motor for operating the tool bits is mounted relative to the track or pathway defined by the docking stations in a manner that allows the drive motor to be translated or moved to a position corresponding to any one of the docking stations, such as by providing a translating motor that moves the drive motor along a rod or track corresponding to the track defined by the docking stations. A reciprocating mechanism is provided such that the drive motor can be temporarily disconnected from and subsequently automatically connected to any of the docking stations. The drive motor operates a drive spindle that rotates when activated by a controller means, such as a foot pedal. The drive motor is translated to a desired docking position and moved into a connected configuration, such that the drive spindle mates with a cable spindle such that the rotational movement is transferred into the drive shaft. The desired working operation is then performed, with operation of the tool bit controlled by a foot pedal or similar means. When a different tool bit is needed, the drive motor is disconnected from the docking station, translated to the desired docking station, and connected to the docking station of the desired tool bit, which now becomes operational.

DETAILED DESCRIPTION OF THE INVENTION

Figure 1:
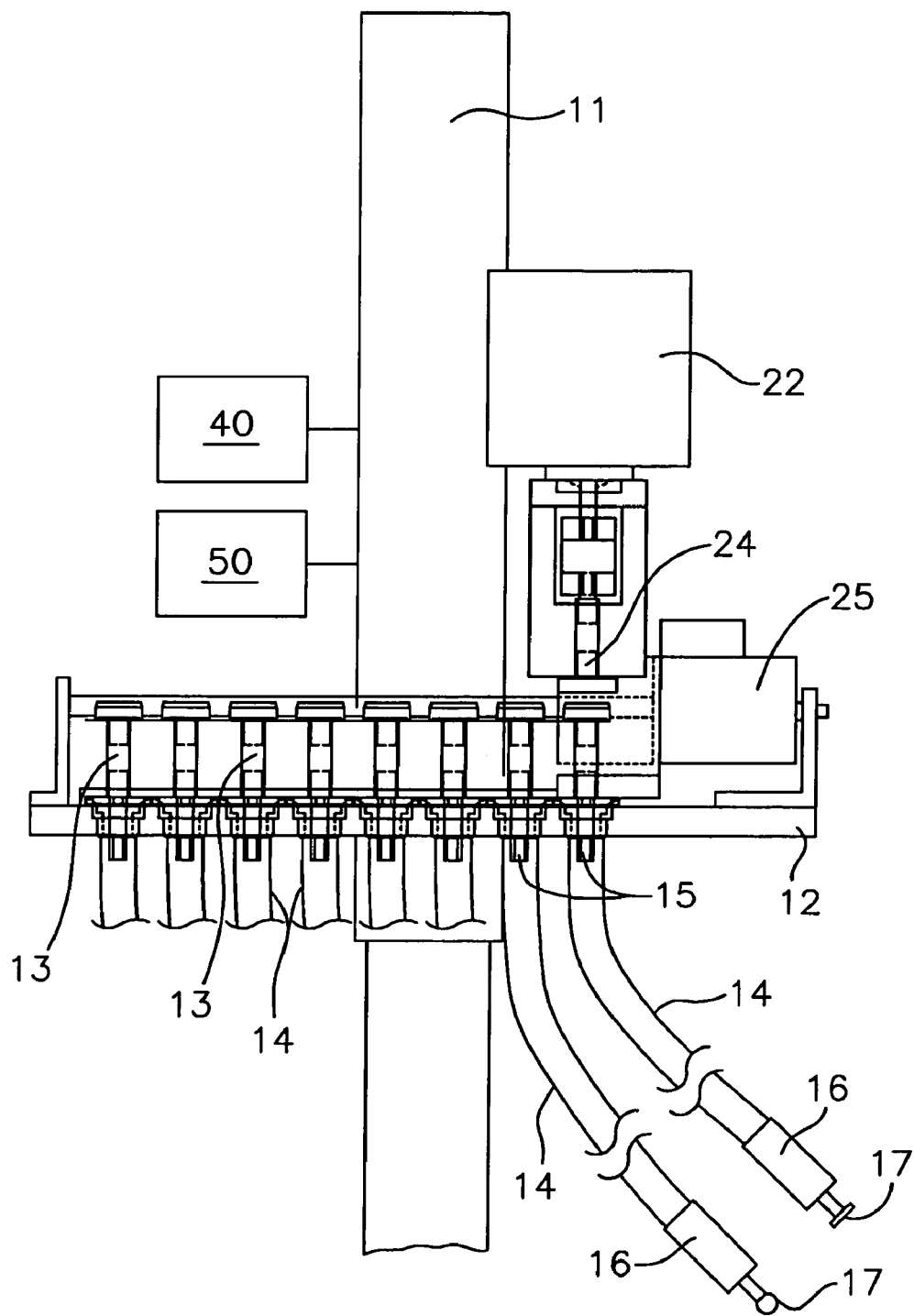
FIG. 1 is a front view of the invention.
Figure 2:
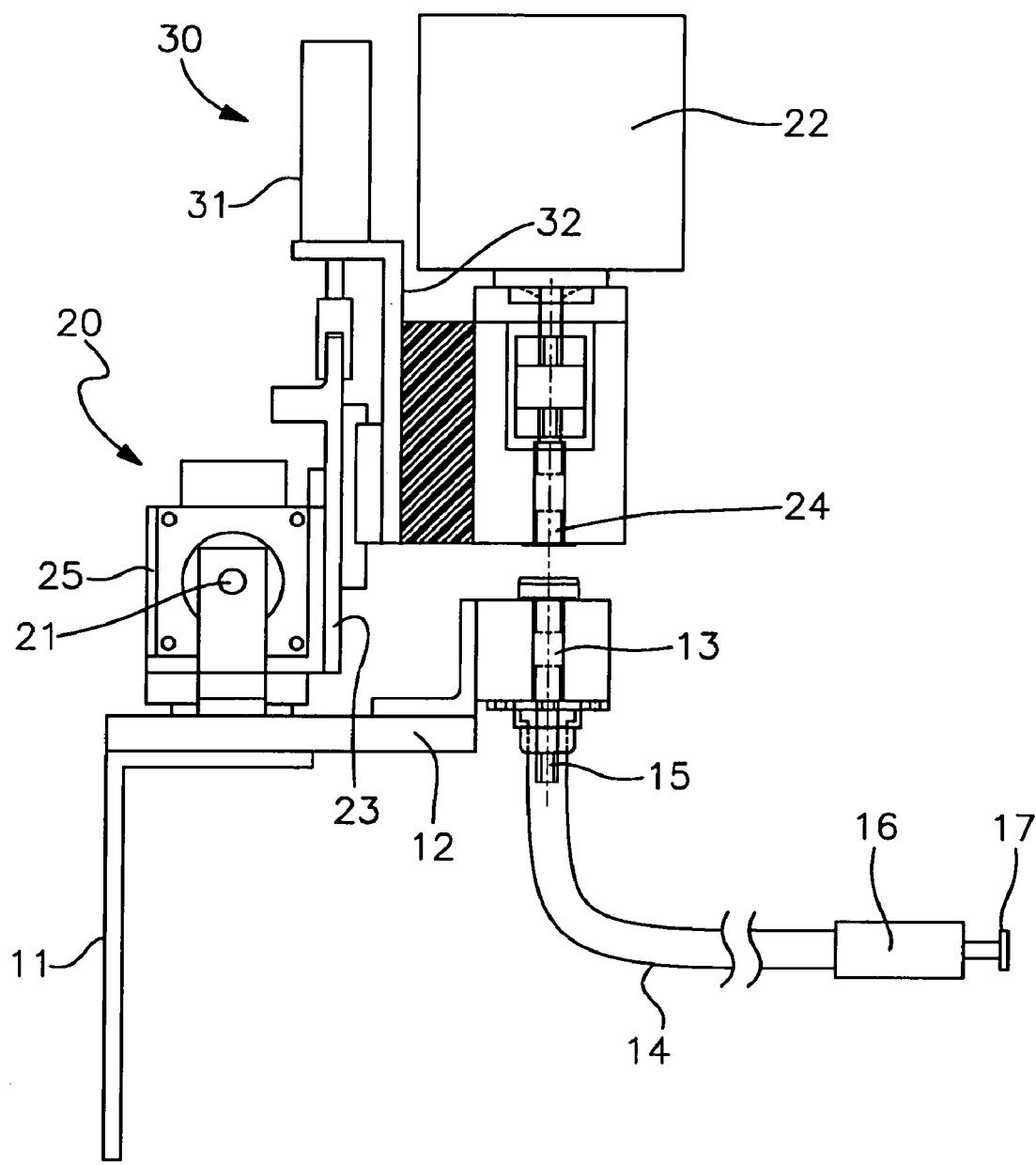
FIG. 2 is a side view of the invention.
Figure 3:
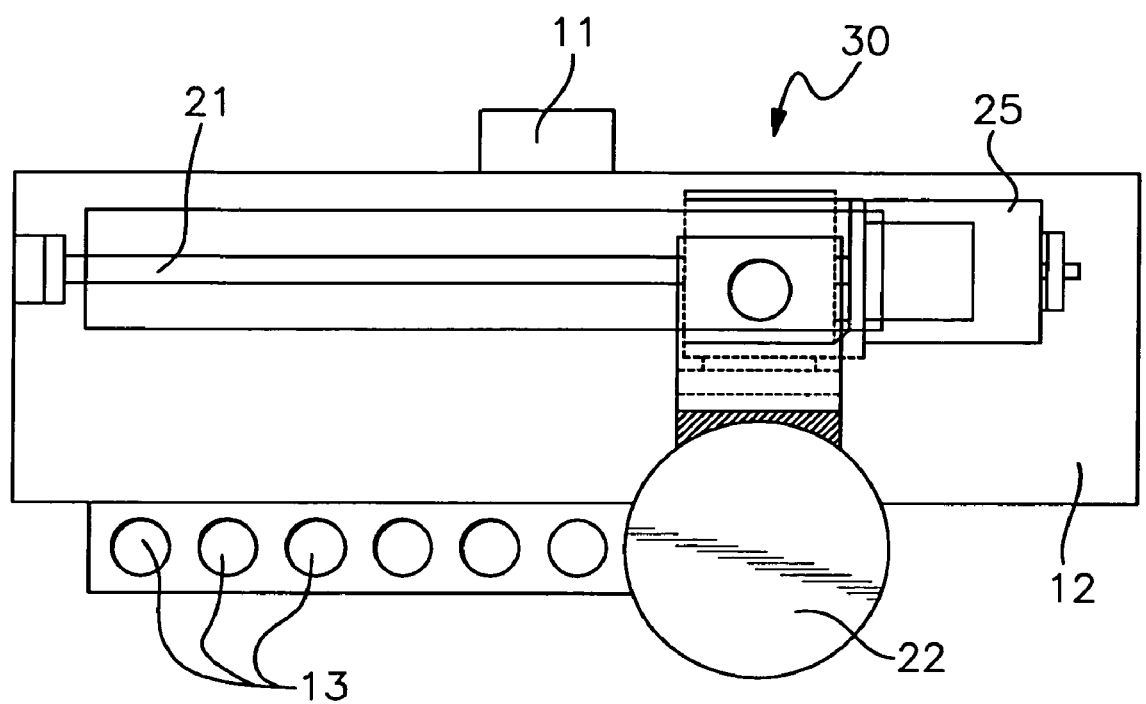
FIG. 3 is a top view of the invention.

The invention comprises a mount, stand, housing or similar support means 11 that supports a base member 12. Positioned on base member 12 are dedicated docking stations 13. The combination of docking stations 13 defines a pathway, along which the docking stations 13 are preferably equidistantly spaced. As shown in the drawings, the pathway is linear and oriented horizontally, but the defined pathway could be curved, angled, circular, elliptical, inclined, vertical, etc. A flexible power transmission shaft or cable 14 is connected to each docking station 13, preferably connecting to a cable spindle 15 mounted within the docking station 13, such that each docking station has a dedicated flexible shaft 14. A dedicated handpiece 16 retaining a particular tool bit 17 is disposed on each flexible shaft 14. The handpieces 16 may allow for interchangeability of the tool bits 17.

A translation track 21 is mounted onto or in relation to base member 12, with translation track 21 corresponding to the pathway defined by the docking stations 13. The translation track 21 may be a rod, threaded shaft, channel or like structure that provides for controlled movement of a drive motor or similar power means 22. Drive motor 22 is mounted onto a translating bracket 23 such that drive motor 2, and in particular drive spindle 24 can be disposed in a position relative to each docking station 13 whereby the drive spindle 24 may be temporarily connected to or mated with the cable spindle 15 of a particular docking station 13, such that the rotation of the drive spindle 24 by drive motor 22 is transferred to the cable spindle 15, and then through flexible shaft 14 to tool bit 17. Translation means 20 for moving the power means 22 along translation track 21 includes a translation or indexing motor 25.

Motor engagement means 30 are provided in order to move the drive motor 22 and drive spindle 24 from a mated position connected to a docking station 13 and cable spindle 15 into a non-mated position where the drive motor 22 and drive spindle 24 are disconnected or released from the docking station 13 and cable spindle 15, such that the drive motor 22 and drive spindle 24 can be translated along the translation track 21 for connection to a different docking station 13 and cable spindle 15. The motor engagement means 30 comprises a reciprocating mechanism 31, such as for example an electric-operated cylinder, motor, screw, chain, or other mechanical structures, to which the drive motor 22 is connected by a motor mount 32, that separates and engages, for example in this case, lifts and lowers, the motor mount 32, drive motor 22 and drive spindle 24 relative to the docking station 13 and cable spindle 15.

Indexing control means 40 of known type, shown representationally, comprising for example a panel of buttons, a positioning knob, a foot pedal or the like, control the motor engagement means 30 and the motor translation means 20, such that actuation of the indexing control means 40, in order for a chosen tool bit 17 to be utilized, causes the drive motor 22 and drive spindle 24 to be disconnected or released from a first docking station 13 and cable spindle 15 by the motor engagement means 30. This is accomplished by physically repositioning the drive motor 22 and drive spindle 24 in the axial direction. After separation and sufficient clearance has been achieved, the translation motor 25 is activated and the drive motor 22 and drive spindle 24 are moved along track 21 to the location of the second docking station 13 corresponding to the chosen tool bit 17. The drive motor 22 and drive spindle 24 are then brought by motor engagement means 30 into operative connection with the cable spindle 15, flexible shaft 14, handpiece 16 and chosen tool bit 17. Tool control means 50 of known type, shown representationally, comprising for example a foot pedal or switches incorporated on the handpieces 16, are used to initiate rotation of the tool bit 17 and to control the rotational speed thereof.

It is understood that equivalents and substitutions for certain elements described above may be obvious to those skilled in the art, and therefore the true scope and definition of the invention is to be as set forth in the following claims.

I claim:

1. A flexible-shaft powered multiple hand tool apparatus comprising:
    multiple independent handpieces each receiving a tool bit;
    multiple flexible power transmission shafts, with each said handpiece being connected to one of said flexible power transmission shafts;
    multiple docking stations, with each said flexible power transmission shaft being connected to one of said docking stations;
    a single drive motor, said single drive motor selectively providing power to said handpieces;
    motor engagement means to connect and disconnect said drive motor to one of said docking stations in order to transfer power to said handpieces; and
    translation means to move said drive motor from one said docking station to another said docking station;
    whereby when operation of a first said handpiece connected to a first said docking station is completed and operation of a second said handpiece connected to a second said docking station is desired, said motor engagement means disconnects said drive motor from said first docking station, said translation means moves said drive motor from said first docking station to said second docking station, and said motor engagement means connects said drive motor to said second docking station.

2. The apparatus of claim 1, further comprising a drive spindle connected to said drive motor and multiple cable spindles connected to said flexible shafts at said docking stations, wherein said drive spindle mates with said cable spindles at said docking stations.

3. The apparatus of claim 1, wherein the relative locations of said docking stations define a pathway and said translation means moves said drive motor along said pathway.

4. The apparatus of claim 3, wherein said translation means comprises a translation track upon which said drive motor moves.

5. The apparatus of claim 1, wherein said translation means comprises a translation motor.

6. The apparatus of claim 1, wherein said motor engagement means comprises a cylinder, wherein said drive motor is reciprocatingly moved between a connected position and a disconnected position.

7. A multiple hand tool apparatus comprising:
    multiple independent handpieces each receiving a tool bit;
    multiple dedicated docking stations positioned on a base member in fixed relation, with one of each of said handpieces being connected to one of said docking stations;
    a single drive motor, said single drive motor selectively providing power to one of said handpieces through one of said docking stations;
    motor engagement means to connect and disconnect said drive motor to one of said docking stations; and
    translation means to move said drive motor from one said docking station to another said docking station;

whereby when operation of a first said handpiece connected to a first said docking station is completed and operation of a second said handpiece connected to a second said docking station is desired, said motor engagement means disconnects said drive motor from said first docking station, said translation means moves said drive motor from said first docking station to said second docking station, and said motor engagement means connects said drive motor to said second docking station.

8. The apparatus of claim 1, further comprising dedicated flexible shafts joining said handpieces to said docking stations.

9. The apparatus of claim 8, further comprising a drive spindle connected to said drive motor and multiple cable spindles connected to said flexible shafts at said docking stations, wherein said drive spindle mates with said cable spindles at said docking stations.

10. The apparatus of claim 7, wherein the relative locations of said docking stations define a pathway and said translation means moves said drive motor along said pathway.

11. The apparatus of claim 10, wherein said translation means comprises a translation track upon which said drive motor moves.

12. The apparatus of claim 7, wherein said translation means comprises a translation motor.

13. The apparatus of claim 7, wherein said motor engagement means comprises a cylinder, wherein said drive motor is reciprocatingly moved between a connected position and a disconnected position.

* * * * *